US012616988B2

(12) United States Patent
Huang et al.

(10) Patent No.: US 12,616,988 B2
(45) Date of Patent: May 5, 2026

(54) KITCHEN SHOWERHEAD AND KITCHEN FAUCET

(71) Applicant: BESTWARE HARDWARE PRODUCTION CO., LTD., Jiangmen (CN)

(72) Inventors: Weiqiang Huang, Jiangmen (CN); Jian Hu, Jiangmen (CN)

(73) Assignee: BESTWARE HARDWARE PRODUCTION CO., LTD., Jiangmen (CN)

( * ) Notice: Subject to any disclaimer, the term of this patent is extended or adjusted under 35 U.S.C. 154(b) by 548 days.

(21) Appl. No.: 18/025,897

(22) PCT Filed: May 28, 2021

(86) PCT No.: PCT/CN2021/096902
§ 371 (c)(1),
(2) Date: Mar. 12, 2023

(87) PCT Pub. No.: WO2022/077920
PCT Pub. Date: Apr. 21, 2022

(65) Prior Publication Data
US 2023/0356246 A1 Nov. 9, 2023

(30) Foreign Application Priority Data
Oct. 16, 2020 (CN) ......................... 202011107302.0

(51) Int. Cl.
*B05B 12/00* (2018.01)
*B05B 1/18* (2006.01)

(52) U.S. Cl.
CPC .............. *B05B 12/002* (2013.01); *B05B 1/18* (2013.01)

(58) Field of Classification Search
CPC ....... B05B 12/002; B05B 1/18; B05B 1/1654; B05B 12/0024; B05B 1/3013;
(Continued)

(56) References Cited

U.S. PATENT DOCUMENTS

2006/0273205 A1* 12/2006 Wang ..................... F16K 1/526 239/525
2012/0012676 A1 1/2012 Hu
(Continued)

FOREIGN PATENT DOCUMENTS

CN 2382913 Y 6/2000
CN 106120995 A 11/2016
(Continued)

OTHER PUBLICATIONS

Search Report dated Aug. 16, 2024 received in Chinese Patent Application No. 2020111073020.
(Continued)

*Primary Examiner* — Qingzhang Zhou
(74) *Attorney, Agent, or Firm* — Scully, Scott, Murphy & Presser, P.C.

(57) ABSTRACT

A kitchen showerhead and a kitchen faucet are disclosed. The kitchen showerhead includes a pressing valve, a piston cylinder, a first compression spring, and a showerhead body; the pressing valve has a valve body and a pressing rod, a water inlet and a water outlet are respectively arranged on both ends of the valve body, a water stop opening is arranged in a water passing cavity, the pressing rod is inserted into the water stop opening, and a pressing end and a water stop piston are respectively arranged on both ends of the pressing rod; and one end of the water stop piston facing away from the water stop opening and the piston cylinder form a hydraulic cavity, the water stop piston is provided with a water passing hole communicated with the hydraulic cavity,
(Continued)

and the hydraulic cavity is communicated with the water inlet through the water passing hole.

20 Claims, 4 Drawing Sheets

(58) Field of Classification Search
CPC . E03C 1/0405; F16K 1/00; F16K 1/32; F16K 1/42; F16K 21/04; F16K 31/60; F16K 47/02; F16K 47/023
See application file for complete search history.

(56) References Cited

U.S. PATENT DOCUMENTS

| | | | | |
|---|---|---|---|---|
| 2017/0128959 | A1* | 5/2017 | Chen | B05B 1/1654 |
| 2017/0342692 | A1 | 11/2017 | Hu | |

FOREIGN PATENT DOCUMENTS

| | | | |
|---|---|---|---|
| CN | 206190988 | U | 5/2017 |
| CN | 213929454 | U | 8/2021 |
| EP | 1656997 | B1 | 9/2008 |
| EP | 1825919 | B1 | 5/2009 |
| EP | 2141324 | A2 | 1/2010 |

OTHER PUBLICATIONS

Supplementary European search report dated Oct. 17, 2024 received in European Patent Application No. 21 87 8973.

* cited by examiner

B

KITCHEN SHOWERHEAD AND KITCHEN FAUCET

CROSS-REFERENCE TO RELATION APPLICATIONS

This application is a national stage filing under 35 U.S.C. § 371 of international application number PCT/CN2021/096902, filed May 28, 2021, which claims priority to Chinese patent application No. 202011107302.0 filed Oct. 16, 2020. The contents of these applications are incorporated herein by reference in their entirety.

TECHNICAL FIELD

The disclosure relates to the technical field of kitchen accessories, and particularly to a kitchen showerhead and a kitchen faucet.

BACKGROUND

Kitchen showerhead is widely used in commercial and industrial kitchens, such as kitchens of hotels, restaurants and food processing plants, and is generally mounted on a faucet in kitchen for cleaning kitchen utensils, such as pots and pans, and washing vegetables. The kitchen showerhead is generally provided with a pressing switch valve to control water spraying or water stopping of the kitchen showerhead. However, existing pressing switch valves have poor hand feeling, quick rebound, large noise, and easily damaged precise valve core part in the pressing switch valve, resulting in water leakage of the kitchen showerhead, so that it is necessary to replace and maintain the pressing switch valve frequently, thereby having high maintenance costs.

SUMMARY

The disclosure aims to solve at least one of the technical problems in the existing technology. Therefore, the disclosure provides a kitchen showerhead, which has better hand feeling, higher durability and a low maintenance cost.

The disclosure further provides a kitchen faucet comprising the kitchen showerhead above.

The kitchen showerhead according to an embodiment in a first aspect of the disclosure comprises a pressing valve, a piston cylinder, a first compression spring and a showerhead body, wherein the pressing valve is provided with a valve body and a pressing rod, a water passing cavity is arranged in the valve body, a water inlet and a water outlet which are communicated with the water passing cavity are respectively arranged on both ends of the valve body, a water stop opening is arranged in the water passing cavity, the pressing rod is inserted into the water stop opening, one end of the pressing rod is provided with a pressing end penetrating through the valve body, and the other end of the pressing rod is provided with a water stop piston for closing the water stop opening; the piston cylinder is arranged on the valve body, the water stop piston is inserted into the piston cylinder, one end of the water stop piston facing away from the water stop opening and the piston cylinder form a hydraulic cavity, the water stop piston is provided with a water passing hole communicated with the hydraulic cavity, and the hydraulic cavity is communicated with the water inlet through the water passing hole; the first compression spring is located in the hydraulic cavity, one end of the first compression spring abuts against the water stop piston, and the other end of the first compression spring abuts against the piston cylinder; and the showerhead body is arranged at the water outlet.

The kitchen showerhead according to an embodiment in the first aspect of the disclosure has at least the following beneficial effects. One end of the pressing rod of the pressing valve is provided with the water stop piston, and the water stop piston is inserted into a piston sleeve of a valve seat to form the hydraulic cavity; and the hydraulic cavity is cooperated with the water passing hole, which can reduce a speed at which the pressing rod is pressed and a speed at which the pressing rod is pushed back by the first compression spring, and make a moving speed of the pressing rod more uniform, so as to improve pressing hand feeling of the pressing valve and use hand feeling, and moreover, an impact force between the water stop piston and the water stop opening can be reduced, so that noise is reduced, the water stop piston and the water stop opening are protected, and abrasions of the water stop piston and the water stop opening are reduced, so as to reduce maintenance times and maintenance costs.

According to an embodiment in the first aspect of the disclosure, one side of the water stop piston facing the water stop opening is provided with a sealing plug for closing the water stop opening.

According to an embodiment in the first aspect of the disclosure, a middle portion of the pressing rod is provided with a conical section, a larger end of the conical section is connected with the water stop piston, and a smaller end of the conical section is connected with the pressing end.

According to an embodiment in the first aspect of the disclosure, an outer diameter of the larger end of the conical section is matched with an inner diameter of the water stop opening.

According to an embodiment in the first aspect of the disclosure, the water stop piston is provided with an accommodating groove for accommodating the first compression spring, and the water passing hole is located in a groove wall of the accommodating groove.

According to an embodiment in the first aspect of the disclosure, the showerhead body comprises a first valve seat, a second valve seat rotatably connected with the first valve seat, and a showerhead nozzle and a fan-shaped nozzle which are arranged on the second valve seat, the first valve seat is provided with a first input hole communicated with the water outlet and a first output hole communicated with the first input hole, and one side of the second valve seat facing the first output hole is provided with a second input hole communicated with the showerhead nozzle and a third input hole communicated with the fan-shaped nozzle; and when the second valve seat rotates, one of the second input hole and the third input hole is communicated with the first output hole.

According to an embodiment in the first aspect of the disclosure, two first output holes are provided, two second input holes are provided and uniformly distributed around a rotating shaft of the second valve seat, and when one of the first output holes is communicated with one of the second input holes, the other one of the first output holes is communicated with the other one of the second input holes.

According to an embodiment in the first aspect of the disclosure, the first output hole is provided with a first sealing groove, a sealing ring is arranged in the first sealing groove, a middle portion of the sealing ring is provided with a through hole, and a second compression spring for pressing the sealing ring to the second valve seat is arranged in the first sealing groove.

According to an embodiment in the first aspect of the disclosure, one side of the first valve seat facing the second valve seat is provided with a blind hole, a positioning pin and a third compression spring driving the positioning pin to press to the second valve seat are arranged in the blind hole, and one end of the positioning pin facing the second valve seat is provided with a round top; when the round top is inserted into the second input hole, the first output hole is communicated with the third input hole; and when the round top is inserted into the third input hole, the first output hole is communicated with the second input hole.

The kitchen faucet according to an embodiment in a second aspect of the disclosure comprises the kitchen showerhead above.

The kitchen faucet according to an embodiment in the second aspect of the disclosure has at least the following beneficial effects. One end of the pressing rod of the pressing valve of the kitchen showerhead is provided with the water stop piston, and the water stop piston is inserted into a piston sleeve of a valve seat to form the hydraulic cavity; and the hydraulic cavity is cooperated with the water passing hole, which can reduce a speed at which the pressing rod is pressed and a speed at which the pressing rod is pushed back by the first compression spring, and make a moving speed of the pressing rod more uniform, so as to improve pressing hand feeling of the pressing valve and hand feeling of the kitchen showerhead, and moreover, an impact force between the water stop piston and the water stop opening can be reduced, so that noise is reduced, the water stop piston and the water stop opening are protected, and abrasion of the pressing valve is reduced, so as to reduce maintenance times of the kitchen faucet and maintenance costs of the kitchen faucet.

Additional aspects and advantages of the disclosure will be given in part in the following description, which will become apparent from the following description or be understood through practice of the disclosure.

BRIEF DESCRIPTION OF THE DRAWINGS

The above and/or additional aspects and advantages of the disclosure will become apparent and easy to understand from the descriptions of embodiments with reference to the following drawings, wherein.

REFERENCE NUMERALS

Figure 1:
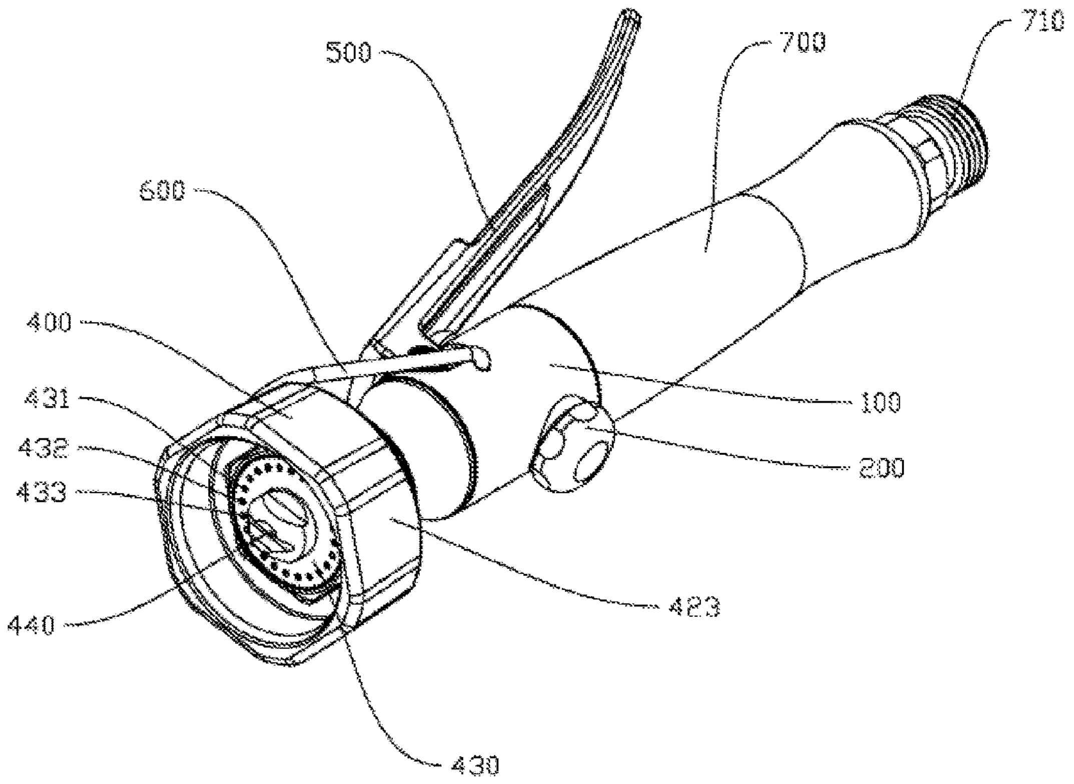
FIG. 1 is a schematic structural diagram of a kitchen showerhead according to an embodiment in a first aspect of the disclosure.

- 100 refers to pressing valve, 110 refers to valve body, 111 refers to water passing cavity, 112 refers to water inlet, 113 refers to water outlet, 114 refers to water stop opening, 120 refers to pressing rod, 121 refers to pressing end, 122 refers to water stop piston, 123 refers to water passing hole, 124 refers to sealing plug, 125 refers to conical section, 126 refers to accommodating groove,
- 200 refers to piston cylinder, 210 refers to hydraulic cavity,
- 300 refers to first compression spring,
- 400 refers to showerhead body, 410 refers to first valve seat, 411 refers to first input hole, 412 refers to first output hole, 413 refers to first sealing groove, 414 refers to sealing ring, 415 refers to through hole, 416 refers to second compression spring, 417 refers to blind hole, 418 refers to positioning pin, 419 refers to third compression spring, 420 refers to second valve seat, 421 refers to second input hole, 422 refers to third input hole, 423 refers to showerhead sleeve, 430 refers to showerhead nozzle, 431 refers to first water spraying port, 432 refers to second water spraying port, 433 refers to third water spraying port, 440 refers to fan-shaped nozzle,
- 500 refers to switch handle, 600 refers to constantly-opened pressing ring, and
- 700 refers to handle, and 710 refers to water conveying pipe.

DETAILED DESCRIPTION

Specific embodiments of the disclosure will be described in detail in this part, preferred embodiments of the disclosure are shown in the drawings, and the drawings are intended to supplement the description in the text part of the specification with figures, so that people can intuitively and vividly understand each technical feature and the overall technical solution of the disclosure, but it cannot be understood as a limitation to the scope of protection of the disclosure.

In the description of the disclosure, it should be understood that, the description with reference to the orientation or position relationship indicated by the terms “upper”, “lower”, “front”, “rear”, “left”, “right”, and the like is based on the orientation or position relationship shown in the drawings, which is only used for convenience of the description of the disclosure and simplification of the description instead of indicating or implying that the indicated device or element must have a specific orientation, and be constructed and operated in a specific orientation, and thus should not be understood as a limitation to the disclosure.

In the description of the disclosure, the meaning of several refers to being one or more, and the meaning of multiple refers to being two or more. The meanings of greater than, less than, more than, etc., are understood as not including the following number, while the meanings of above, below, within, etc., are understood as including the following number. If there is the description of first and second, it is only for the purpose of distinguishing between technical features, and should not be understood as indicating or implying relative importance, implicitly indicating the number of the indicated technical features or implicitly indicating the order of the indicated technical features.

In the description of the disclosure, unless otherwise explicitly defined, the terms “setting”, “mounting” and “connecting” should be understood in a broad sense, and those of ordinary skills in the art can reasonably determine the specific meanings of the above terms in the disclosure in combination with the specific contents of the technical solution.

With reference to FIG. 1 to FIG. 6, according to an embodiment in a first aspect of the disclosure, a kitchen showerhead is provided, which comprises a pressing valve 100, a piston cylinder 200, a first compression spring 300 and a showerhead body 400. The pressing valve 100 is provided with a valve body 110 and a pressing rod 120, a water passing cavity 111 is arranged in the valve body 110, a water inlet 112 and a water outlet 113 which are communicated with the water passing cavity 111 are respectively arranged on both ends of the valve body 110, a water stop opening 114 is arranged in the water passing cavity 111, the pressing rod 120 is inserted into the water stop opening 114, one end of the pressing rod 120 is provided with a pressing end 121 penetrating through the valve body 110, and the other end of the pressing rod 120 is provided with a water stop piston 122 for closing the water stop opening 114. The piston cylinder 200 is arranged on the valve body 110, the water stop piston 122 is inserted into the piston cylinder 200, one end of the water stop piston 122 facing away from the water stop opening 114 and the piston cylinder 200 form a hydraulic cavity 210, the water stop piston 122 is provided with a water passing hole 123 communicated with the hydraulic cavity 210, and the hydraulic cavity 210 is communicated with the water inlet 112 through the water passing hole 123. The first compression spring 300 is located in the hydraulic cavity 210, one end of the first compression spring 300 abuts against the water stop piston 122, and the other end of the first compression spring 300 abuts against the piston cylinder 200. The showerhead body 400 is arranged at the water outlet 113. The water inlet 112 and the water outlet 113 of the valve body 110 are located on both ends of the valve body 110, a middle portion in the water passing cavity 111 is provided with the water stop opening 114, and the water stop piston 122 is located on one side of the water stop opening 114 communicated with the water inlet 112. The valve body 110 is provided with a hole for the pressing end 121 to penetrate through, which facilitates the pressing end 121 to protrude from the valve body 110, and is convenient for a user to press the pressing rod 120 to open the water stop opening 114, so that water flows through the water stop opening 114 from the water inlet 112, flows out from the water outlet 113, and finally is sprayed out from the showerhead body 400 to clean kitchen utensils. A rubber sealing ring is arranged between the pressing end 121 and a hole wall of the valve body 110 to prevent water leakage. There is also a rubber sealing ring arranged between an inner wall of the piston cylinder 200 and the water stop piston 122 to prevent water in the hydraulic cavity 210 or water in the water inlet 112 from flowing through a gap between the piston cylinder 200 and the water stop piston 122, so that water can only flow into or out of the hydraulic cavity 210 through the water passing hole 123. The first compression spring 300 is configured for driving the water stop piston 122 to press to the water stop opening 114, which means that the first compression spring is configured for reset, so that the first compression spring 300 will press the water stop piston 122 to the water stop opening 114 when no one presses the pressing rod 120, thereby achieving a function of closing a waterway.

When the pressing end 121 of the pressing rod 120 is pressed by the user, the water stop piston 122 of the pressing rod 120 will move towards the piston cylinder 200 to open the water stop opening 114 and communicate the water inlet 112 with the water outlet 113. Moreover, the water stop piston 122 allows the first compression spring 300 to store energy and compress a space of the hydraulic cavity 210 at the moment, so that a water pressure in the hydraulic cavity 210 is increased, thereby reducing a speed at which the pressing rod 120 is pressed to the piston cylinder 200, reducing rigid collisions between the water stop piston 122 and the piston cylinder 200, and reducing damages of the water stop piston 122 and the piston cylinder 200. Secondly, when the water pressure in the hydraulic cavity 210 is increased, the water inlet 112 is communicated with the water stop opening 114, then a water pressure at the water inlet 112 is low, and water in the hydraulic cavity 210 will be squeezed out of the water passing hole 123 and flow to the water inlet 112, which serves to reduce the water pressure in the hydraulic cavity 210, thereby preventing the piston cylinder 200 from exploding, reducing a force pressed to the pressing rod 120, allowing the user to better press the pressing rod 120, and facilitating the showerhead body 400 to discharge water. The water passing hole 123 is configured for balancing the water pressure in the hydraulic cavity 210 and the water pressure at the water inlet 112. A force required for the user to press the pressing rod 120 to open the water stop opening 114 is related to the size of the water passing hole 123. The larger the size of the water passing hole 123 is, the larger the flow rate of the water passing hole 123 will be, then the faster the pressure relief speed of the hydraulic cavity 210 will be, and then the smaller the pressure exerted by the water in the hydraulic cavity 210 on the water stop piston 122 will be. Therefore, the force required for the user to press the pressing rod 120 to open the water stop opening 114 will be smaller. On the contrary, the smaller the size of the water passing hole 123 is, the larger the force required for the user to press the pressing rod 120 to open the water stop opening 114 will be. When a force exerted by the user on the pressing end 121 is smaller than an elastic force of the first compression spring 300, the first compression spring 300 will drive the water stop piston 122 to close the water stop opening 114, which will increase a volume of the hydraulic cavity 210 and reduce the water pressure in the hydraulic cavity 210, and then the water pressure in the hydraulic cavity 210 is lower than the water pressure at the water inlet 112, so that the hydraulic cavity 210 generates a suction force for the water stop piston 122, thereby reducing a moving speed of the water stop piston 122 to the water stop opening 114, reducing an impact force generated by the water stop piston 122 colliding with the water stop opening 114, reducing noise generated by the water stop piston 122 colliding with the water stop opening 114, and reducing collision abrasions of the water stop piston 122 and the water stop opening 114, so as to prolong a service life of the pressing valve 100, reduce maintenance times of the pressing valve 100, and reduce maintenance costs. When the water pressure in the hydraulic cavity 210 is reduced, and then the water pressure in the hydraulic cavity 210 is lower than the water pressure at the water inlet 112, water in the water inlet 112 will flow into the hydraulic cavity 210 from the water passing hole 123, thereby increasing the water pressure in the hydraulic cavity 210, preventing a pressure in the hydraulic cavity 210 from being too low, and preventing the piston cylinder 200 from being damaged. The smaller the size of the water passing hole 123 is, the lower the recovering speed of the pressure in the hydraulic cavity 210 will be, so that the hydraulic cavity 210 can better reduce a speed of the water stop piston 122, can better reduce the impact force between the water stop piston 122 and the water stop opening 114, preventing the water stop piston 122 and the water stop opening 114 at key positions in the pressing valve 100 from being damaged. The hydraulic cavity 210 is cooperated with the water passing hole 123, which can reduce a speed at which the pressing rod 120 is pressed and a speed at which the pressing rod is pushed back by the first compression spring 300, and make a moving speed of the pressing rod 120 more uniform, thereby improving pressing hand feeling of the pressing valve 100 and hand feeling of the kitchen showerhead.

Figure 2:
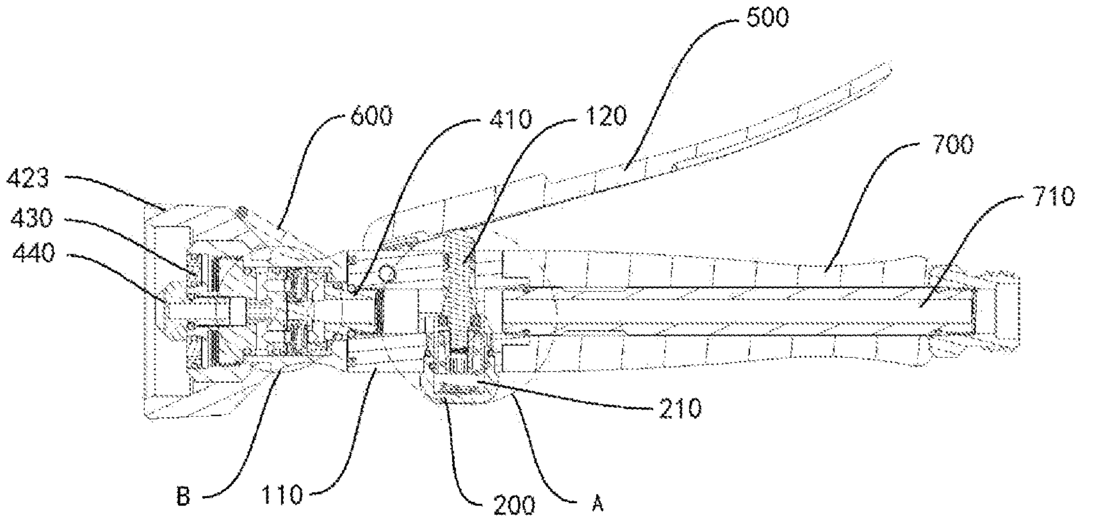
FIG. 2 is a cross-section view of a first output hole communicated with a third input hole according to an embodiment in the first aspect of the disclosure.

With reference to FIG. 1 and FIG. 2, according to some embodiments in the first aspect of the disclosure, in order to better enable the user to press the pressing end 121, the valve body 110 of the pressing valve 100 is hinged with a switch handle 500, and a middle portion of the switch handle 500 abuts against the pressing end 121, which means that the user may press the pressing end 121 by pressing the switch handle 500, so that it is effort-saving and convenient for the user to control opening and closing of the pressing valve 100. On the above basis, the valve body 110 is hinged with a constantly-opened pressing ring 600, and the switch handle 500 is provided with a clamping groove matched with the constantly-opened pressing ring 600. When the constantly-opened pressing ring 600 is clamped in the clamping groove, the constantly-opened pressing ring 600 may make the switch handle 500 press the pressing end 121 to open the pressing valve 100, so that when kitchen utensils are washed, the constantly-opened pressing ring 600 is cooperated with the clamping groove. Therefore, the pressing valve 100 can be opened without pressing the switch handle 500 for a long time, which facilitates washing the kitchen utensils and is convenient for use.

With reference to FIG. 1 and FIG. 2, according to some embodiments in the first aspect of the disclosure, the water inlet 112 of the valve body 110 is connected with a handle 700, and a middle portion of the handle 700 is provided with a water conveying pipe 710 communicated with the water inlet 112, which means that tap water may be input from the water conveying pipe 710 and flow into the water inlet 112, thereby ensuring water supply of the kitchen showerhead. Moreover, the handle 700 may be grasped by the user, which is convenient for the user to press the pressing end 121 with a hand. Moreover, cooperated with the switch handle 500 above, it is more convenient for the user to press the pressing end 121, so that it is convenient for the user to use.

Figure 3:
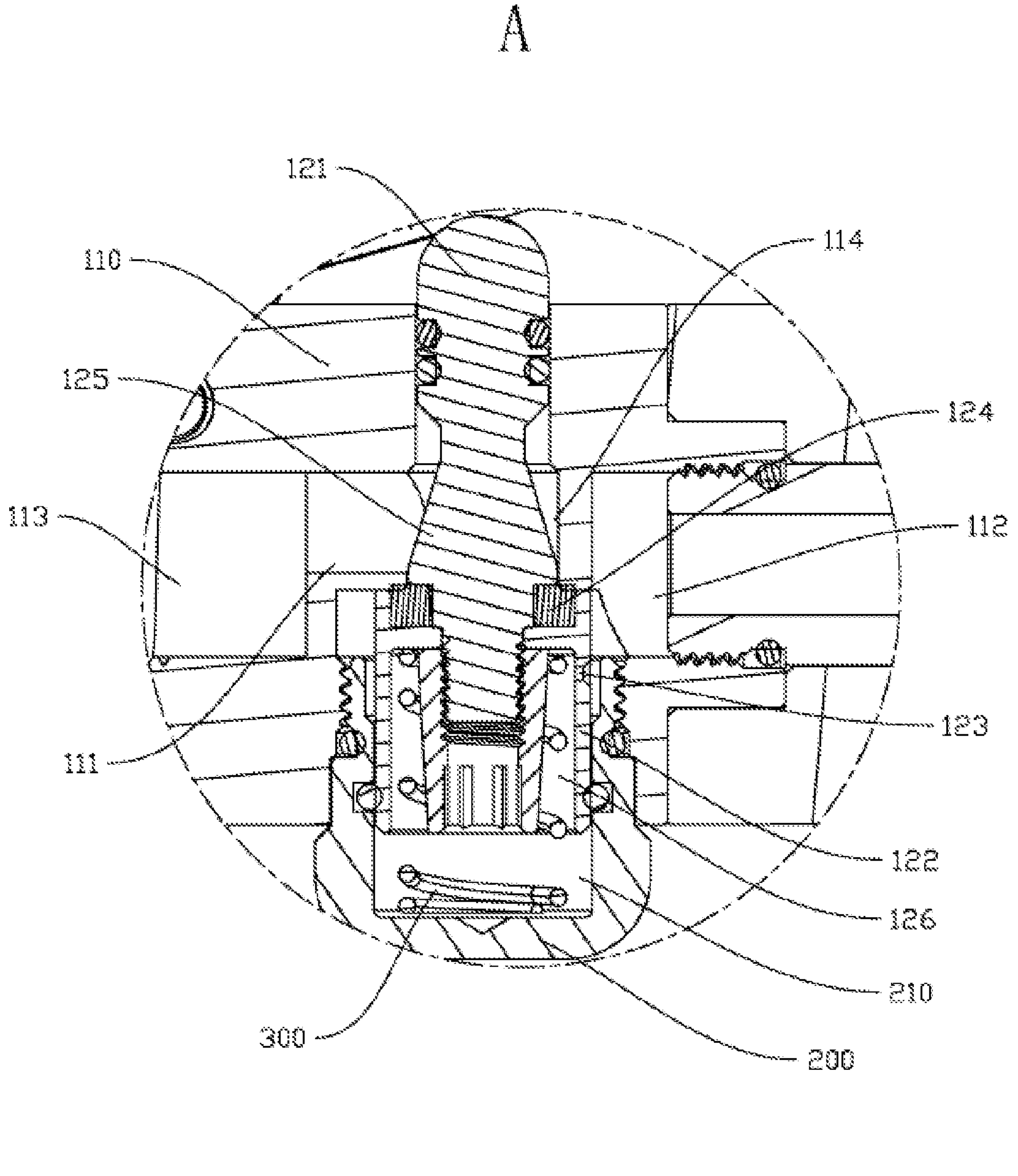
FIG. 3 is an enlarged view of a part A in FIG. 2.

With reference to FIG. 2 and FIG. 3, according to some embodiments in the first aspect of the disclosure, one side of the water stop piston 122 facing the water stop opening 114 is provided with a sealing plug 124 for closing the water stop opening 114. The sealing plug 124 may make the water stop piston 122 close the water stop opening 114, and the sealing plug 124 can further reduce an impact force of the water stop piston 122 on the water stop opening 114, thereby further reducing impact noise between the water stop piston 122 and the water stop opening 114, better protecting the water stop piston 122 and the water stop opening 114, and reducing abrasions of the water stop piston 122 and the water stop opening 114. Specifically, one side of the water stop piston 122 facing the water stop opening 114 is provided with a mounting groove, and the sealing plug 124 is mounted in the mounting groove. It should be noted that the sealing plug 124 is a rubber plug. In addition, the sealing plug 124 may also be a plug for sealing, such as a wooden plug.

With reference to FIG. 2 and FIG. 3, according to some embodiments in the first aspect of the disclosure, a middle portion of the pressing rod 120 is provided with a conical section 125, a larger end of the conical section 125 is connected with the water stop piston 122, and a smaller end of the conical section 125 is connected with the pressing end 121. The conical section 125 penetrates through the water stop opening 114, which means that the conical section 125 is located in the water stop opening 114. When the pressing rod 120 pushes the water stop piston 122 to move towards the piston cylinder 200, the water inlet 112 is communicated with the water outlet 113 through a gap between the conical section 125 and the water stop opening 114. Since the larger end of the conical section 125 is connected with the water stop piston 122, when the pressing rod 120 pushes the water stop piston 122 to move towards the piston cylinder 200, the gap between the conical section 125 and the water stop opening 114 will be gradually increased, so that a flow rate of the water outlet 113 can be increased, thereby achieving the purpose of adjusting a flow rate of the showerhead body 400. On the above basis, an outer diameter of the larger end of the conical section 125 is matched with an inner diameter of the water stop opening 114. That is, the outer diameter of the larger end of the conical section 125 is equal to the inner diameter of the water stop opening 114, so that the larger end of the conical section 125 can also close the water stop opening 114, and then the water stop opening 114 can be better closed through the cooperation between the conical section 125 and the water stop piston 122, thereby preventing water leakage.

With reference to FIG. 2 and FIG. 3, according to some embodiments in the first aspect of the disclosure, the water stop piston 122 is provided with an accommodating groove 126 for accommodating the first compression spring 300, and the water passing hole 123 is located in a groove wall of the accommodating groove 126. That is, one side of the water stop piston 122 facing the piston cylinder 200 is provided with the accommodating groove 126, so that the first compression spring 300 can be placed in the accommodating groove 126, thereby preventing the first compression spring 300 from being separated from the water stop piston 122. Therefore, the first compression spring 300 can better make the water stop piston 122 reset. Moreover, the water passing hole 123 is located in the groove wall of the accommodating groove 126, which is convenient for forming the water passing hole 123 in the water stop piston 122.

According to some embodiments in the first aspect of the disclosure, when the pressing rod 120 is pressed to an end, a cylinder wall of the piston cylinder 200 closes the water passing hole 123, which means that after the user presses the pressing rod 120, the piston cylinder 200 may close the water passing hole 123. At the moment, the hydraulic cylinder 210 is closed, and the water pressure in the hydraulic cylinder 210 cannot be released, so that a maximum resistance force of the pressing rod 120 is exerted on the hand of the user to realize feedback to the hand of the user, thereby improving pressing hand feeling of the pressing valve 100.

With reference to FIG. 2, FIG. 4, FIG. 5 and FIG. 6, according to some embodiments in the first aspect of the disclosure, the showerhead body 400 comprises a first valve seat 410, a second valve seat 420 rotatably connected with the first valve seat 410, and a showerhead nozzle 430 and a fan-shaped nozzle 440 which are arranged on the second valve seat 420. The first valve seat 410 is provided with a first input hole 411 communicated with the water outlet 113 and a first output hole 412 communicated with the first input hole 411, and one side of the second valve seat 420 facing the first output hole 412 is provided with a second input hole 421 communicated with the showerhead nozzle 430 and a third input hole 422 communicated with the fan-shaped nozzle 440. When the second valve seat 420 rotates, one of the second input hole 421 and the third input hole 422 is communicated with the first output hole 412. An outer side of the second valve seat 420 is rotatably connected with the first valve seat 410, so that the second valve seat 420 may rotate by 360 degrees relative to the first valve seat 410, one end surface of the second valve seat 420 is opposite to one end surface of the first valve seat 410, the first output hole 412 is located in one end surface of the first valve seat 410 facing the second valve seat 420, and the second input hole 421 and the third input hole 422 are located in one end surface of the second valve seat 420 facing the first output hole 412. When the second valve seat 420 rotates around the first valve seat 410, movement trajectories of the second input hole 421 and the third input hole 422 will pass through the first output hole 412, so that the first output hole 412 may be communicated with one of the second input hole 421 and the third input hole 422. When the first output hole 412 is communicated with the second input hole 421, water discharged from the water outlet 113 will flow through the first input hole 411, the first output hole 412 and the second input hole 421, and then the water is sprayed out from the showerhead nozzle 430, thereby achieving the purpose of making the showerhead nozzle 430 spray water to clean the kitchen utensils. Similarly, when the first output hole 412 is communicated with the third input hole 422, the water discharged from the water outlet 113 will flow through the first input hole 411, the first output hole 412 and the third input hole 422, and then V-shaped water mist will be sprayed out from the fan-shaped nozzle 440 to clean the kitchen utensils. That is, the second valve seat 420 may rotate by 360 degrees, and the first output hole 412 may be selected to be communicated with the second input hole 421 or the third input hole 422 during rotation, thereby achieving the purpose of selecting a water discharge type.

Figure 5:
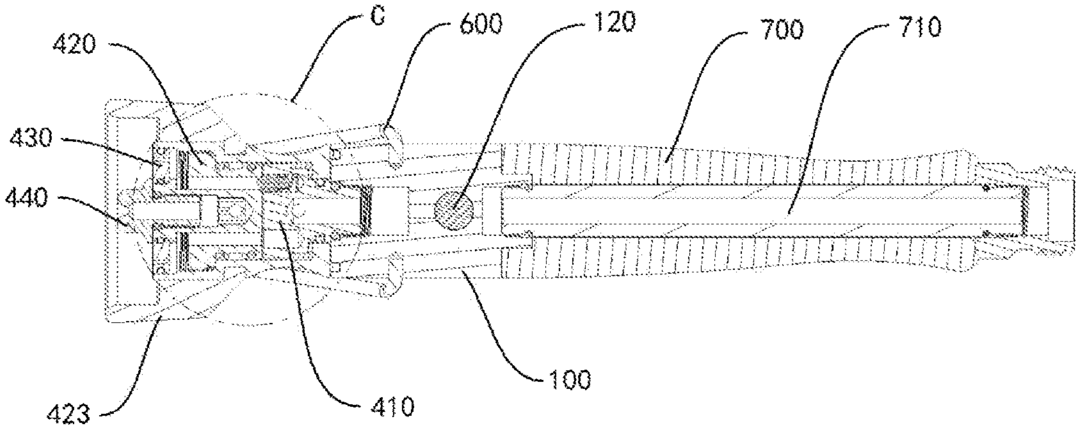
FIG. 5 is a cross-section view of a positioning pin abutting against a second input hole according to an embodiment in the first aspect of the disclosure.
Figure 6:
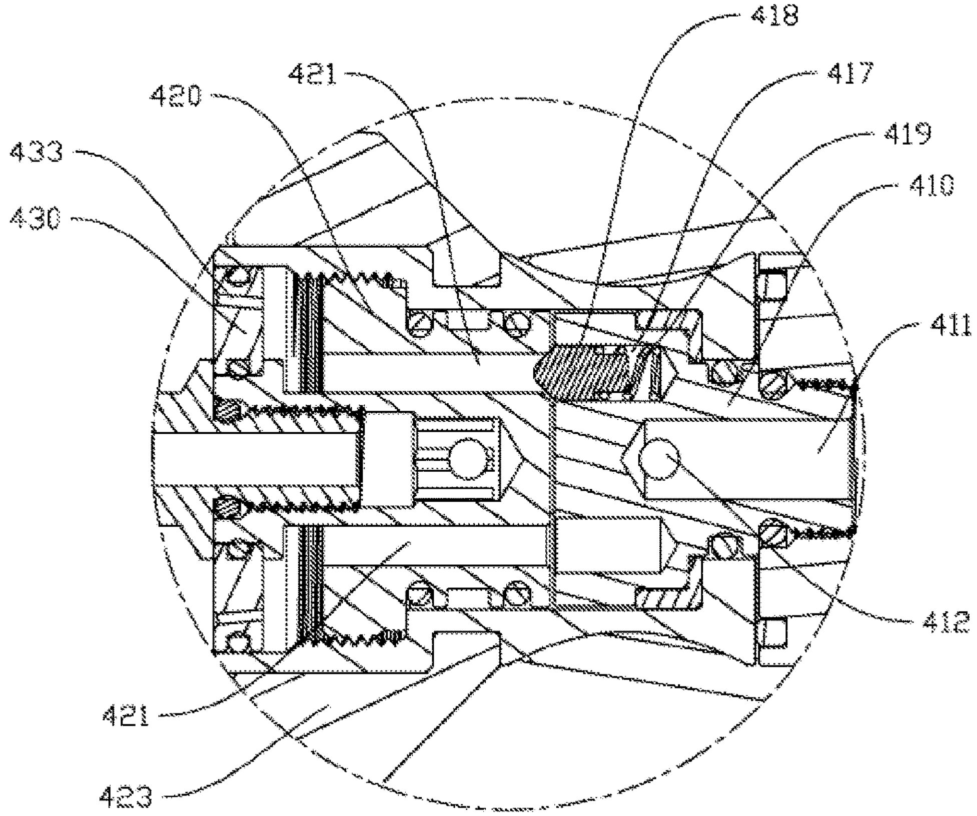
FIG. 6 is an enlarged view of a part C in FIG. 5.

With reference to FIG. 5 and FIG. 6, according to some embodiments in the first aspect of the disclosure, two first output holes 412 are provided, two second input holes 421 are also provided and uniformly distributed around a rotating shaft of the second valve seat 420. When one of the first output holes 412 is communicated with one of the second input holes 421, the other one of the first output holes 412 is communicated with the other one of the second input holes 421. The showerhead nozzle 430 is round, and the fan-shaped nozzle 440 is arranged in a middle portion of the showerhead nozzle 430. An included angle between the two second input holes 421 and the rotating shaft of the second valve seat 420 is 180 degrees, and the two first output holes 412 will be respectively communicated with the two second input holes 421 at the same time, so that the second input holes 421 are both supplied with water, and the water is more uniformly discharged from the showerhead nozzle 430.

Figure 4:
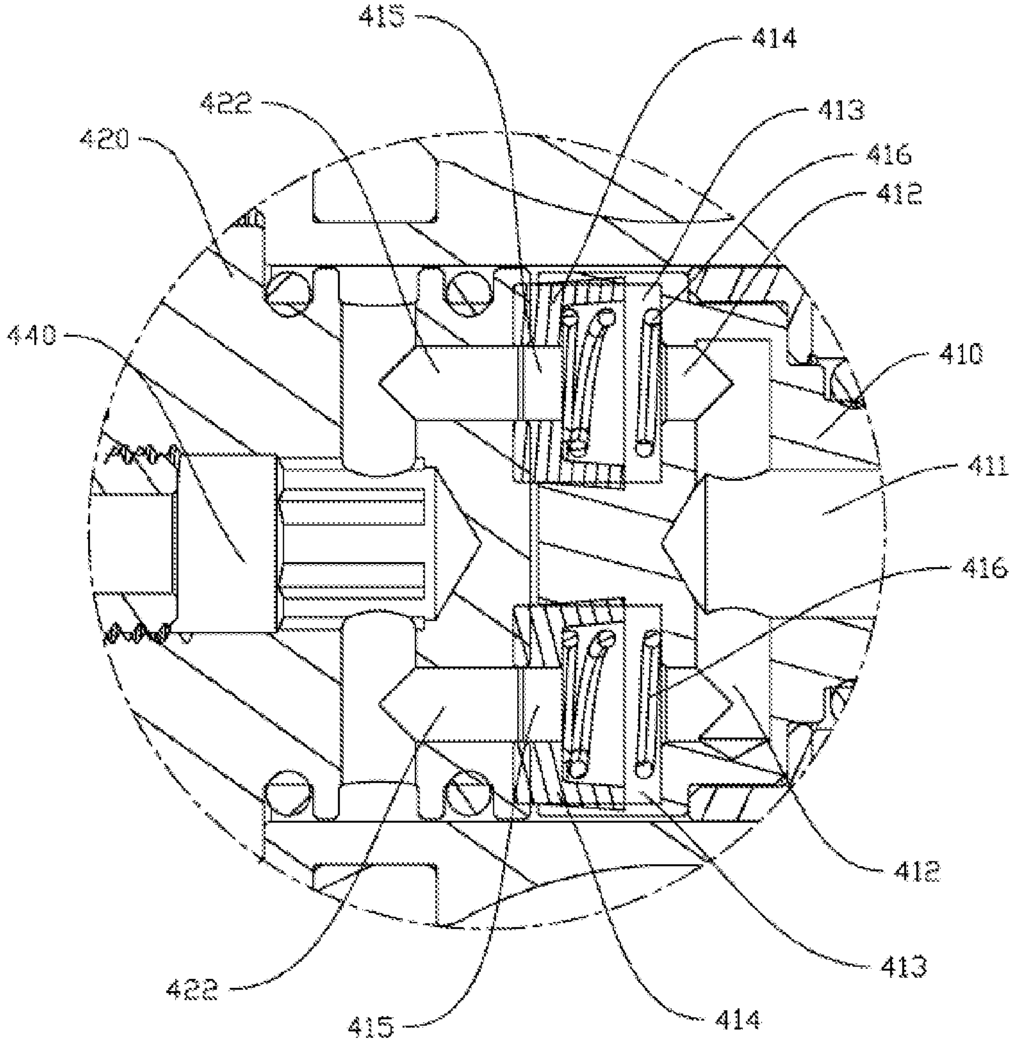
FIG. 4 is an enlarged view of a part B in FIG. 2.

With reference to FIG. 2 and FIG. 4, according to some embodiments in the first aspect of the disclosure, the first output hole 412 is provided with a first sealing groove 413, a sealing ring 414 is arranged in the first sealing groove 413, a middle portion of the sealing ring 414 is provided with a through hole 415, and a second compression spring 416 for pressing the sealing ring 414 to the second valve seat 420 is also arranged in the first sealing groove 413. The first sealing ring 414 is in interference fit with the first sealing groove 413, so that water in the first output hole 412 can only flow out from the through hole 415, thereby preventing water leakage. Moreover, the second compression spring 416 can press the sealing ring 414 to the second valve seat 420, so that the sealing ring 414 can seal a periphery of the second input hole 421 or the third input hole 422, and the through hole 415 is communicated with the second input hole 421 or the third input hole 422, thereby being convenient for water discharge.

With reference to FIG. 5 and FIG. 6, according to some embodiments in the first aspect of the disclosure, one side of the first valve seat 410 facing the second valve seat 420 is provided with a blind hole 417, a positioning pin 418 and a third compression spring 419 driving the positioning pin 418 to press to the second valve seat 420 are arranged in the blind hole 417, and one end of the positioning pin 418 facing the second valve seat 420 is provided with a round top. When the round top is inserted into the second input hole 421, the first output hole 412 is communicated with the third 30) input hole 422. When the round top is inserted into the third input hole 422, the first output hole 412 is communicated with the second input hole 421. That is, the positioning pin 418 may extend and retract in the blind hole 417, and an outer diameter of the round top is larger than inner diameters of the third input hole 422 and the second input hole 421. When the second valve seat 420 rotates, the round top will abut against one of the third input hole 422 or the second input hole 421, and close one of the third input hole 422 or the second input hole 421, so that the first output hole 412 will be communicated with the unblocked third input hole 422 or second input hole 421 at the moment, thereby realizing communication and facilitating water discharge. Moreover, when the second valve seat 420 continuously rotates, the closed hole will push the round top, so that the positioning pin 418 is separated from the closed hole to switch the hole that the positioning pin 418 abuts against, thereby achieving the purpose of switching the water discharge type.

With reference to FIG. 1, according to some embodiments in the first aspect of the disclosure, an outer side of the second valve seat 420 is provided with a showerhead sleeve 423, and the showerhead sleeve 423 may be used for decoration, and may make water in the showerhead nozzle 430 better gather together, which facilitates cleaning the kitchen utensils.

With reference to FIG. 1, FIG. 5 and FIG. 6, according to some embodiments in the first aspect of the disclosure, the showerhead nozzle 430 is provided with a plurality of first water spraying ports 431, second water spraying ports 432 and third water spraying ports 433 which are uniformly distributed around the rotating shaft of the second valve seat 420. An ejecting axis of the first water spraying port 431 approaches inwardly, an ejecting axis of the second water spraying port 432 is parallel to the rotating shaft of the second valve seat 420, and an ejecting axis of the third water spraying port 433 diverges outwardly, so that water flows at three different angles are ejected out, and the water flows may be ejected to the kitchen utensils more uniformly, thereby facilitating cleaning the kitchen utensils.

A kitchen faucet (not drawn in the drawings) according to an embodiment in a second aspect of the disclosure comprises the kitchen showerhead above. The kitchen faucet is provided with a water discharge pipe and an on-off valve, wherein the on-off valve is configured for controlling whether the water discharge pipe discharges water, and a water discharge end of the water discharge pipe is connected with the kitchen showerhead. The kitchen faucet may be directly mounted at a cleaning tank in a kitchen to clean the kitchen utensils. One end of the pressing rod 120 of the pressing valve 100 of the kitchen showerhead is provided with the water stop piston 122, and the water stop piston 122 is inserted into a piston sleeve of a valve seat to form the hydraulic cavity 210. The hydraulic cavity 210 is cooperated with the water passing hole 123, which can reduce a speed at which the pressing rod 120 is pressed and a speed at which the pressing rod is pushed back by the first compression spring 300, and make a moving speed of the pressing rod 120 more uniform, so as to improve pressing hand feeling of the pressing valve 100 and hand feeling of the kitchen showerhead, and moreover, an impact force between the water stop piston 122 and the water stop opening 114 can be reduced, so that noise is reduced, the water stop piston 122 and the water stop opening 114 are protected, and abrasion of the pressing valve 100 is reduced, so as to reduce maintenance times and maintenance costs.

In the description of the disclosure, the descriptions with reference to the terms "one embodiment", "some embodiments", "schematic embodiments", "examples", "specific examples", or "some examples" refer to that the specific features, structures, materials, or characteristics described in combination with the embodiment or example are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

Although the embodiments of the disclosure have been shown and described, those of ordinary skills in the art may understand that various changes, modifications, substitutions and variations may be made to these embodiments without departing from the principle and purpose of the disclosure, and the scope of the disclosure is defined by the claims and their equivalents.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

What is claimed is:

1. A kitchen showerhead, comprising:

a pressing valve provided with a valve body and a pressing rod, wherein a water passing cavity is arranged in the valve body, a water inlet and a water outlet which are communicated with the water passing cavity are respectively arranged on both ends of the valve body, a water stop opening is arranged in the water passing cavity, the pressing rod is inserted into the water stop opening, one end of the pressing rod is provided with a pressing end penetrating through the valve body, and the other end of the pressing rod is provided with a water stop piston for closing the water stop opening;

a piston cylinder arranged on the valve body, wherein the water stop piston is inserted into the piston cylinder, one end of the water stop piston facing away from the water stop opening and the piston cylinder form a hydraulic cavity, the water stop piston is provided with a water passing hole communicated with the hydraulic cavity, and the hydraulic cavity is communicated with the water inlet through the water passing hole;

a first compression spring located in the hydraulic cavity, wherein one end of the first compression spring abuts against the water stop piston, and the other end of the first compression spring abuts against the piston cylinder; and a showerhead body arranged at the water outlet;

wherein a middle portion of the pressing rod is provided with a conical section, a larger end of the conical section is connected with the water stop piston, and a smaller end of the conical section is connected with the pressing end.

2. The kitchen showerhead according to claim 1, wherein one side of the water stop piston facing the water stop opening is provided with a sealing plug for closing the water stop opening.

3. The kitchen showerhead according to claim 1, wherein an outer diameter of the larger end of the conical section is matched with an inner diameter of the water stop opening.

4. The kitchen showerhead according to claim 1, wherein the water stop piston is provided with an accommodating groove for accommodating the first compression spring, and the water passing hole is located in a groove wall of the accommodating groove.

5. The kitchen showerhead according to claim 1, wherein the showerhead body comprises a first valve seat, a second valve seat rotatably connected with the first valve seat, and a showerhead nozzle and a fan-shaped nozzle which are arranged on the second valve seat, the first valve seat is provided with a first input hole communicated with the water outlet and a first output hole communicated with the first input hole, and one side of the second valve seat facing the first output hole is provided with a second input hole communicated with the showerhead nozzle and a third input hole communicated with the fan-shaped nozzle; and when the second valve seat rotates, one of the second input hole and the third input hole is communicated with the first output hole.

6. The kitchen showerhead according to claim 5, wherein two first output holes are provided, two second input holes are provided and uniformly distributed around a rotating shaft of the second valve seat, and when one of the first output holes is communicated with one of the second input holes, the other one of the first output holes is communicated with the other one of the second input holes.

7. The kitchen showerhead according to claim 5, wherein the first output hole is provided with a first sealing groove, a sealing ring is arranged in the first sealing groove, a middle portion of the sealing ring is provided with a through hole, and a second compression spring for pressing the sealing ring to the second valve seat is arranged in the first sealing groove.

8. The kitchen showerhead according to claim 5, wherein one side of the first valve seat facing the second valve seat is provided with a blind hole, a positioning pin and a third compression spring driving the positioning pin to press to the second valve seat are arranged in the blind hole, and one end of the positioning pin facing the second valve seat is provided with a round top; when the round top is inserted into the second input hole, the first output hole is communicated with the third input hole; and when the round top is inserted into the third input hole, the first output hole is communicated with the second input hole.

9. A kitchen showerhead, comprising:

a pressing valve provided with a valve body and a pressing rod, wherein a water passing cavity is arranged in the valve body, a water inlet and a water outlet which are communicated with the water passing cavity are respectively arranged on both ends of the valve body, a water stop opening is arranged in the water passing cavity, the pressing rod is inserted into the water stop opening, one end of the pressing rod is provided with a pressing end penetrating through the valve body, and the other end of the pressing rod is provided with a water stop piston for closing the water stop opening;

a piston cylinder arranged on the valve body, wherein the water stop piston is inserted into the piston cylinder, one end of the water stop piston facing away from the water stop opening and the piston cylinder form a hydraulic cavity, the water stop piston is provided with a water passing hole communicated with the hydraulic cavity, and the hydraulic cavity is communicated with the water inlet through the water passing hole;

a first compression spring located in the hydraulic cavity, wherein one end of the first compression spring abuts against the water stop piston, and the other end of the first compression spring abuts against the piston cylinder; and a showerhead body arranged at the water outlet;

wherein the water stop piston is provided with an accommodating groove for accommodating the first compression spring, and the water passing hole is located in a groove wall of the accommodating groove.

10. The kitchen showerhead according to claim 9, wherein one side of the water stop piston facing the water stop opening is provided with a sealing plug for closing the water stop opening.

11. The kitchen showerhead according to claim 9, wherein a middle portion of the pressing rod is provided with a conical section, a larger end of the conical section is connected with the water stop piston, and a smaller end of the conical section is connected with the pressing end; and wherein an outer diameter of the larger end of the conical section is matched with an inner diameter of the water stop opening.

12. The kitchen showerhead according to claim 9, wherein the showerhead body comprises a first valve seat, a second valve seat rotatably connected with the first valve seat, and a showerhead nozzle and a fan-shaped nozzle which are arranged on the second valve seat, the first valve seat is provided with a first input hole communicated with the water outlet and a first output hole communicated with the first input hole, and one side of the second valve seat facing the first output hole is provided with a second input hole communicated with the showerhead nozzle and a third input hole communicated with the fan-shaped nozzle; and when the second valve seat rotates, one of the second input hole and the third input hole is communicated with the first output hole.

13. The kitchen showerhead according to claim 12, wherein two first output holes are provided, two second input holes are provided and uniformly distributed around a rotating shaft of the second valve seat, and when one of the first output holes is communicated with one of the second input holes, the other one of the first output holes is communicated with the other one of the second input holes.

14. The kitchen showerhead according to claim 12, wherein the first output hole is provided with a first sealing groove, a sealing ring is arranged in the first sealing groove, a middle portion of the sealing ring is provided with a through hole, and a second compression spring for pressing the sealing ring to the second valve seat is arranged in the first sealing groove.

15. A kitchen showerhead, comprising:

a pressing valve provided with a valve body and a pressing rod, wherein a water passing cavity is arranged in the valve body, a water inlet and a water outlet which are communicated with the water passing cavity are respectively arranged on both ends of the valve body, a water stop opening is arranged in the water passing cavity, the pressing rod is inserted into the water stop opening, one end of the pressing rod is provided with a pressing end penetrating through the valve body, and the other end of the pressing rod is provided with a water stop piston for closing the water stop opening;

a piston cylinder arranged on the valve body, wherein the water stop piston is inserted into the piston cylinder, one end of the water stop piston facing away from the water stop opening and the piston cylinder form a hydraulic cavity, the water stop piston is provided with a water passing hole communicated with the hydraulic cavity, and the hydraulic cavity is communicated with the water inlet through the water passing hole;

a first compression spring located in the hydraulic cavity, wherein one end of the first compression spring abuts against the water stop piston, and the other end of the first compression spring abuts against the piston cylinder; and a showerhead body arranged at the water outlet;

wherein the showerhead body comprises a first valve seat, a second valve seat rotatably connected with the first valve seat, and a showerhead nozzle and a fan-shaped nozzle which are arranged on the second valve seat, the first valve seat is provided with a first input hole communicated with the water outlet and a first output hole communicated with the first input hole, and one side of the second valve seat facing the first output hole is provided with a second input hole communicated with the showerhead nozzle and a third input hole communicated with the fan-shaped nozzle; and when the second valve seat rotates, one of the second input hole and the third input hole is communicated with the first output hole.

16. The kitchen showerhead according to claim 15, wherein one side of the water stop piston facing the water stop opening is provided with a sealing plug for closing the water stop opening.

17. The kitchen showerhead according to claim 15, wherein a middle portion of the pressing rod is provided with a conical section, a larger end of the conical section is connected with the water stop piston, and a smaller end of the conical section is connected with the pressing end;

wherein an outer diameter of the larger end of the conical section is matched with an inner diameter of the water stop opening.

18. The kitchen showerhead according to claim 15, wherein two first output holes are provided, two second input holes are provided and uniformly distributed around a rotating shaft of the second valve seat, and when one of the first output holes is communicated with one of the second input holes, the other one of the first output holes is communicated with the other one of the second input holes.

19. The kitchen showerhead according to claim 15, wherein the first output hole is provided with a first sealing groove, a sealing ring is arranged in the first sealing groove, a middle portion of the sealing ring is provided with a through hole, and a second compression spring for pressing the sealing ring to the second valve seat is arranged in the first sealing groove.

20. The kitchen showerhead according to claim 15, wherein one side of the first valve seat facing the second valve seat is provided with a blind hole, a positioning pin and a third compression spring driving the positioning pin to press to the second valve seat are arranged in the blind hole, and one end of the positioning pin facing the second valve seat is provided with a round top; when the round top is inserted into the second input hole, the first output hole is communicated with the third input hole; and when the round top is inserted into the third input hole, the first output hole is communicated with the second input hole.

* * * * *